United States Patent
Lubbers et al.

(10) Patent No.: US 6,880,052 B2
(45) Date of Patent: Apr. 12, 2005

(54) STORAGE AREA NETWORK, DATA REPLICATION AND STORAGE CONTROLLER, AND METHOD FOR REPLICATING DATA USING VIRTUALIZED VOLUMES

(75) Inventors: Clark Lubbers, Colorado Springs, CO (US); Susan Elkington, Colorado Springs, CO (US); Randy Hess, Colorado Springs, CO (US); Stephen J. Sicola, Palmer Lake, CO (US); James McCarty, Colorado Springs, CO (US); Anuja Korgaonkar, Colorado Springs, CO (US); Jason Leveille, Colorado Springs, CO (US)

(73) Assignee: Hewlett-Packard Development Company, LP, Houston, TX (US)

( * ) Notice: Subject to any disclaimer, the term of this patent is extended or adjusted under 35 U.S.C. 154(b) by 227 days.

(21) Appl. No.: 10/106,906

(22) Filed: Mar. 26, 2002

(65) Prior Publication Data

US 2003/0188114 A1 Oct. 2, 2003

(51) Int. Cl.[7] .............................................. G06F 12/00
(52) U.S. Cl. ............................ 711/162; 711/6; 711/114; 714/6
(58) Field of Search ................................ 711/162, 161, 711/114; 714/6

(56) References Cited

U.S. PATENT DOCUMENTS

| | | | |
|---|---|---|---|
| 5,533,190 A | 7/1996 | Binford et al. | 714/6 |
| 5,721,918 A | 2/1998 | Nilsson et al. | 707/202 |
| 5,893,155 A | 4/1999 | Cheriton | 711/144 |
| 6,041,423 A | 3/2000 | Tsukerman | 714/19 |
| 6,148,368 A | 11/2000 | DeKoning | 711/113 |
| 6,148,414 A * | 11/2000 | Brown et al. | 714/9 |
| 6,185,663 B1 | 2/2001 | Burke | 711/156 |
| 6,275,783 B1 | 8/2001 | Okamura | 702/187 |
| 6,601,187 B1 * | 7/2003 | Sicola et al. | 714/6 |
| 6,629,264 B1 * | 9/2003 | Sicola et al. | 714/15 |
| 6,643,795 B1 * | 11/2003 | Sicola et al. | 714/6 |
| 6,658,540 B1 * | 12/2003 | Sicola et al. | 711/162 |
| 2002/0019908 A1 * | 2/2002 | Reuter et al. | 711/112 |
| 2003/0084241 A1 * | 5/2003 | Lubbers et al. | 711/114 |
| 2003/0131182 A1 * | 7/2003 | Kumar et al. | 711/5 |
| 2003/0172149 A1 * | 9/2003 | Edsall et al. | 709/224 |

OTHER PUBLICATIONS

Elkington, Susan, Enterprise Project, Data Replication Manager Functional Specification for VCS V3 Release, Compaq Computer Corporation, Nov. 30, 3001, pp. 1–68.

Hess, Randy and Korgaonkar, Anuja, Enterprise Project, DRM Logging, Compaq Computer Corporation, Nov. 25, 2001, pp. 1–12.

(Continued)

*Primary Examiner*—Christian P. Chace

(57) ABSTRACT

A storage area network (SAN) controller and method for storing and replicating data between sites in a storage area network in which storage controllers at each site implement storage virtualization. A storage cell is implemented at each site comprising at least one storage controller and a pool of physical storage coupled to the controller. A copy set comprising a logical unit (LUN) of storage, referred to as a member, in each of the storage cells is defined. As operational data transactions are performed against one of the members of a copy set, they are replicated, immediately or after a delay, in each other member of the copy set. As changes are made to dependent attributes such as size of one member of the copy set, the change is replicated in each other member of the copy set automatically. Changes can be made in the independent attributes such as size of each member of the copy set independently of other members of the copy set.

20 Claims, 4 Drawing Sheets

OTHER PUBLICATIONS

Hoffman, Brian, Enterprise Software Functional Specification V0.10, Compaq Computer Corporation, Jul. 25, 2001, pp. 1–26.

Multi–Directional Architectural Design, pp. 1–3, date unknown.

Software Product Description, Compaq SANworks Virtual Replicator–Version 2.0, SPD: 70.41.02, Jun. 5, 2000, pp. 1–5, Compaq Computer Corporation.

Features and Benefits of HSG80 ACS 8.6P Data Replication Manager, Oct. 2001, pp. 1–22, Compaq White Paper, Enterprise Storage Group, Compaq Computer Corporation.

Information Systems—dpANS Fibre Channel Protocol for SCSI, revision 012, Dec. 4, 1995, pp. i–63, American National Standard—draft.

Information Technology– Fibre Channel Protocol for SCSI, second version (FCP–2), Revision 7A, Nov. 1, 2001, pp. ii–133, American National Standard–draft.

Storage Virtualization and the *StorageWorks* Enterprise Virtual Array, COMPAQ White Paper, Sep. 2001, Enterprise Storage Array Division Marketing, Compaq Computer Corporation, pp. 1–13.

SCSI–2 Spec—Logical characteristics, http://www.uni-mainz.de/~koenig/scsi/SCSI2–06.html, Mar. 8, 2002, pp. 3–31.

Understanding Replication in Databases and Distributed Systems, copyright Nikos Drakos, Computer Based Learning Unit, University of Leeds, pp. 1–26, translation initiated by Matthias Wiesmann on Nov. 2, 1999.

ENSA–2 *VersaStor* Virtualization Technology, Enterprise Storage Group, *Storage Works* by COMPAQ White Paper, Dec. 2001, Compaq Computer Corporation, pp. 1–10.

NCITS T10, Project 1144D, Revision 07a, Nov. 1, 2001, pp. 8–26.

StorageWorks by Compaq Enterprise Virtual Array, Quick-Specs, World Wide– version 5, Feb. 27, 2002, pp. 1–12.

T10/98–203 revision 0, Persistent Reservations, Jul. 7, 1998, pp. 1–20.

iSCSI: ISID and the New Persistent Reservations Proposals, http://www.pdi.cmu.edu/mailinglists/ips/mail/msg07055.html, Mar. 19, 2002, pp. 1–4.

* cited by examiner

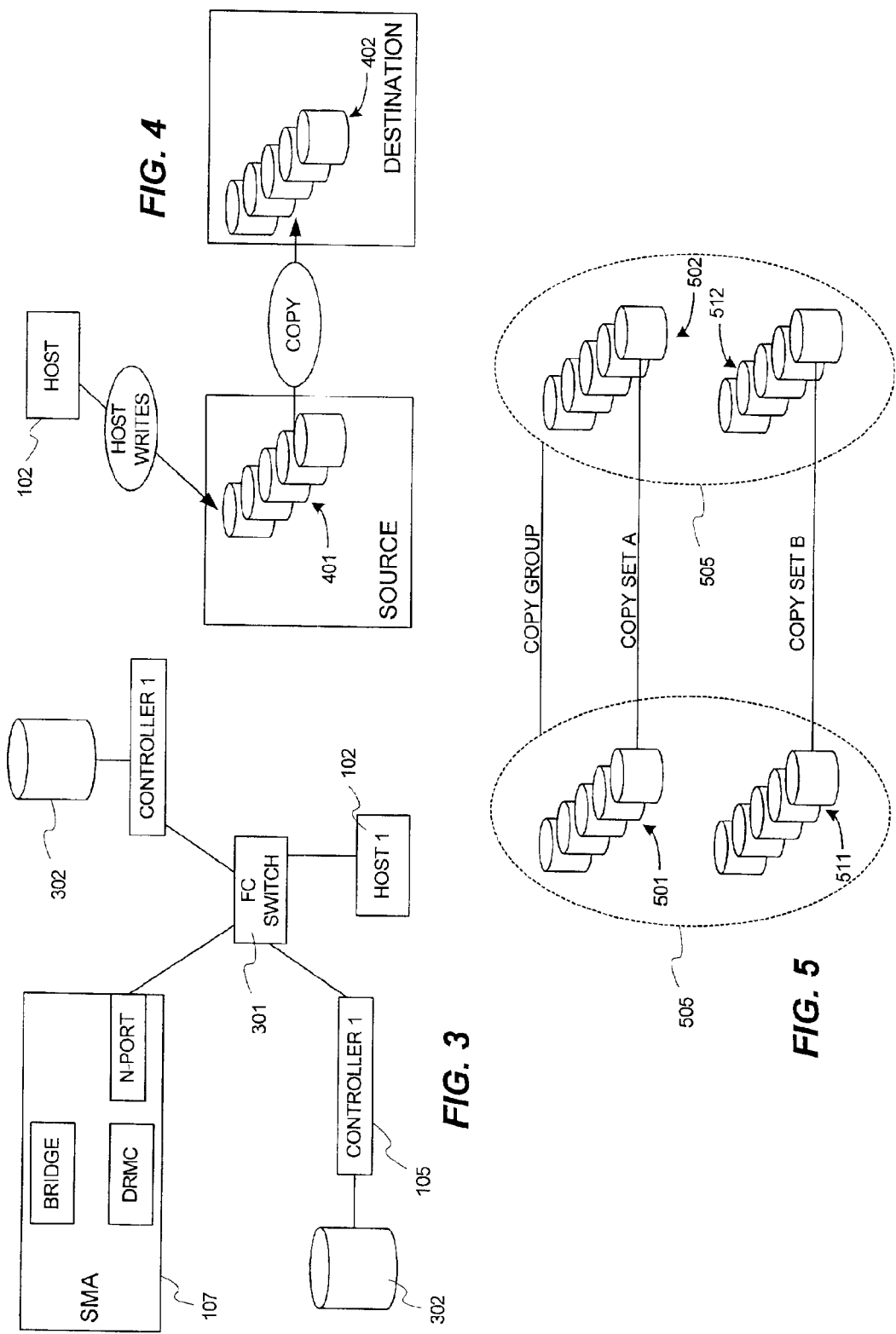

STORAGE AREA NETWORK, DATA REPLICATION AND STORAGE CONTROLLER, AND METHOD FOR REPLICATING DATA USING VIRTUALIZED VOLUMES

FIELD OF THE INVENTION

The present invention relates generally to data replication management, and more specifically to data replication in a system where both source and destination data storage devices are virtualized at a system level such that both source and destination virtual disks are implemented by a plurality of physical storage devices.

BACKGROUND OF THE INVENTION AND PROBLEM

Recent years have seen a proliferation of computers and storage subsystems. Demand for storage capacity grows by over seventy-five percent each year. Early computer systems relied heavily on direct-attached storage (DAS) consisting of one or more disk drives coupled to a system bus. More recently, network-attached storage (NAS) and storage area network (SAN) technology are used to provide storage with greater capacity, higher reliability, and higher availability. The present invention is directed primarily at SAN systems that are designed to provide shared data storage that is beyond the ability of a single host computer to efficiently manage.

Mass data storage systems are implemented in networks or fabrics that provide means for communicating data between systems that use data, and the storage systems that implement the physical storage. In many cases, host computers act as storage servers and are coupled to the network and configured with several disk drives that cumulatively provide more storage capacity or different storage functions (e.g., data protection) than could be implemented by a DAS system. For example, a server dedicated to data storage can provide various degrees of redundancy and mirroring to improve access performance, availability and reliability of stored data. Collecting storage sub-systems, where a separate server manages each sub-system, can form a large storage system. More recently, virtualized storage systems such as the StorageWorks® Enterprise Virtual Array announced by COMPAQ Corporation in October, 2001 provide storage controllers within a fabric or network that present virtualized storage to hosts that require data storage in a manner that enables the host to be uninvolved in the physical configuration, allocation and management of the storage devices. StorageWorks is a registered trademark of COMPAQ Computer Corporation. In this system, hosts simply access logical units of storage that appear to the host as a range of logical address space. Virtualization improves performance and utilization of storage.

SAN systems enable the possibility of storing multiple copies or "replicas" of data at various physical locations throughout the system. Data replication across multiple sites is desirable for a variety of reasons. To provide disaster tolerance, copies of data stored at different physical locations are desired. When one copy becomes unavailable due to equipment failure, a local network outage, natural disaster or the like, a replica located at an alternate site can allow access to the data. Replicated data can also theoretically improve access in normal operation in that replicas can be accessed in parallel, avoiding bottlenecks associated with accessing a single copy of data from multiple systems.

However, prior systems were organized such that one site had a primary role and another site was a replica. Access requests were handled by the primary site until failure, at which time the replica became active. In such architecture, the replica provided little benefit until failure. Similarly, the resources allocated to creating and managing replicas provided minimal load balancing benefit that would enable data access requests to be directed intelligently to replicas such that resources were used more efficiently. Moreover, when multiple replicas are distributed throughout a network topology, it would be beneficial if network delays associated with accessing a topologically remote storage subsystem could be lessened.

In the past, managing a data replication system required significant time and expense. This time and expense was often related to tasks involved in setting up and configuring data replication on a SAN. Physical storage devices between original and replica locations had to be closely matched which could require knowledge at the spindle level to set up a storage site to hold a replica. Similarly detailed knowledge of the physical devices at a storage site were required to set up logging of replication operations. Moreover, the logical structures used to represent, access and manage the stored data had to be substantially identically reproduced at each storage site. Many of these operations required significant manual intervention, as prior data replication architectures were difficult to automate. This complexity made it difficult if not impossible to expand the size of a replicated volume of storage, as the changes on one site needed to be precisely replicated to the other site. A need exists to provide data replication systems in a SAN that enable functions involved in setup and configuration of a replication system to be automated, and allow the configuration to be readily expanded.

It is desirable to provide the ability for rapid recovery of user data from a disaster or significant error event at a data processing facility. This type of capability is often termed "disaster tolerance". In a data storage environment, disaster tolerance requirements include providing for replicated data and redundant storage to support recovery after the event. In order to provide a safe physical distance between the original data and the replicated data, the data is migrated from one storage subsystem or physical site to another subsystem or site. It is also desirable for user applications to continue to run while data replication proceeds in the background. Data warehousing, "continuous computing", and enterprise applications all benefit from remote copy capabilities.

Originally, data replication involved pairs of physical storage devices at a source location and a destination location. The source location operated as a primary data store to handle operational data transactions, whereas the destination location operated as a secondary data store to store copies of data from the source location. The destination location was configured with storage devices of exactly the same capacity and configuration as the source location so that a write transaction to the source location could be duplicated at the destination location.

The necessity of having similarly sized and configured physical devices imposed significant constraints. For example, the physical storage at the destination was dedicated to the corresponding source device, and could not be readily allocated to another source location. Changing the size of the source device required changing the size of the destination device. The destination devices had to be large enough to hold the entire source device capacity, which meant in most cases that large amounts of the destination devices were not used. Moreover, the process of copying data from the source to destination involved byte-by-byte copying of the entire source volume, even where the source volume was sparsely populated. For large volumes in the gigabyte range, this process could easily take hours (or days), during which time the source volume remained unavailable for operational data transactions.

COMPAQ Corporation introduced a data replication management product in its Array Controller Software (ACS) operating on an HSG80 storage controller and described in U.S. Pat. No. 6,601,187 assigned to the assignee of the present application and incorporated herein by reference. This system implemented architecture with redundant storage controllers at each site. Two sites could be paired to enable data replication. While effective, the HSG80 architecture did not virtualize storage at the controller level. Storage virtualization is the transparent abstraction of storage at the block level. Virtualization separates logical data access from physical per-disk data access. Virtualization can occur at any level of a SAN including the server level, fabric level, and storage system level. The inability to virtualize storage at the controller level in prior data replication systems resulted in some inflexibility and inefficiency.

For example, it was prohibitively difficult to increase the size of a replicated volume of storage as the increase had to be implemented precisely at each site. Increasing the size of a logical unit of storage could not be entirely automated. Moreover, the process of copying data from the source to the destination involved byte-by-byte copying of the entire source volume, even where the source volume was sparsely populated. For large volumes in the gigabyte range, this process could take hours (or days).

In such systems, the storage capacity was rigidly allocated at the time a data replication set was created, and data was copied from source to destination before the source was allowed to continue operation. Hence, such systems inherited many of the limitations of non-virtual storage. For example, destination volumes were fully allocated such that unused storage in the source disks was replicated in the destination disks. Also, the source and destination disks required identical configuration such that the data protection level, for example, had to match between the source and destination devices.

Therefore, there remains a need in the art for a data storage system capable of providing data replication services in an expeditious manner with little operational downtime. Moreover, a data storage system is needed that copies data efficiently between locations and allows different members of a data replication set to implement various levels of data protection to meet the needs of a particular application.

SUMMARY OF THE INVENTION

Briefly stated, the present invention involves a method for replicating data between sites in a storage area network in which storage controllers at each site implement storage virtualization. A storage cell is implemented at each site comprising at least one storage controller and a pool of physical storage coupled to the controller. A communication network couples the storage cells. A copy set comprising a logical unit (LUN) of storage, referred to as a member, in each of the storage cells is defined. As operational data transactions are performed against one of the members of a copy set, they are replicated, immediately or after a delay, in each other member of the copy set. A copy set has a number of dependent attributes, such as member size, that are implemented substantially identically in each member. A copy set also has a number of independent attributes, such as a data protection configuration, that may vary from member to member. As changes are made to dependent attributes of one member of the copy set, the change is replicated in each other member of the copy set automatically. Changes can be made in the independent attributes of each member of the copy set independently of other members of the copy set.

In a method for creating a copy set, a LUN in a first storage cell is designated as a source and another storage cell is selected to implement a destination LUN. Preferably, all dependent characteristics of the copy set are implemented while creating the destination LUN. Independent characteristics of the copy set may be specified upon creation, or use pre-specified default values. The destination LUN is then created in the selected storage cell. The source LUN is quiesced while a connection is created between the destination LUN and the source LUN, after which operational data transactions with the source LUN resume. The destination LUN is preferably allocated and populated by copy transactions that occur in the background after normal operational data transactions have resumed with the source LUN.

BRIEF DESCRIPTION OF THE DRAWINGS

FIG. 3 illustrates further alternative computer environment according to an embodiment of the present invention;

FIG. 4 shows data flow relationships in a data replication management operation in accordance with the present invention;

FIG. 5 illustrates logical relationships between data structures of the present invention.

DETAILED DESCRIPTION OF THE PREFERRED EMBODIMENTS

In general, the present invention describes methods for implementing and performing data replication management (DRM) in a storage area network having virtualized storage for both source and destination volumes. Virtualized storage provides many advantages that benefit flexibility and automation of DRM operations. In particular, virtualization enables the size of virtual disks or logical units (LUNs) to be increased in a highly automated fashion. Hence, once a LUN is increased in size, the increase can be propagated automatically to other members of a copy set involved in a DRM group. On the other hand, virtualization of storage creates a level of independence between the source and destination volumes of a data replication set. This allows the data protection level implemented by the various replicas to vary from replica-to-replica. This may result in the quantity of physical storage used to implement a replica varying from the quantity used to implement other members of the data replication set. Also, destination disks or replicas are created "on-the-fly" in a manner that enables destination disk creation, allocation, resizing, and reconfiguration with little interruption of operational data transactions. Moreover, the present invention enables background copy operations to proceed between members of a replica set while operational data transfers proceed simultaneously.

The present invention is described with various levels of specificity to ease description and understanding. However, unless specified otherwise, the specific implementations are examples only, and not limitations of the invention. For example, network connectivity is illustrated by fibre channel mechanisms, however, other network mechanisms provide suitable functionality in particular environments. In particular implementations storage capacity is presented as SCSI (small computer system interface) logical units, although the particular protocol is readily varied to meet the needs of a particular application.

Figure 1:
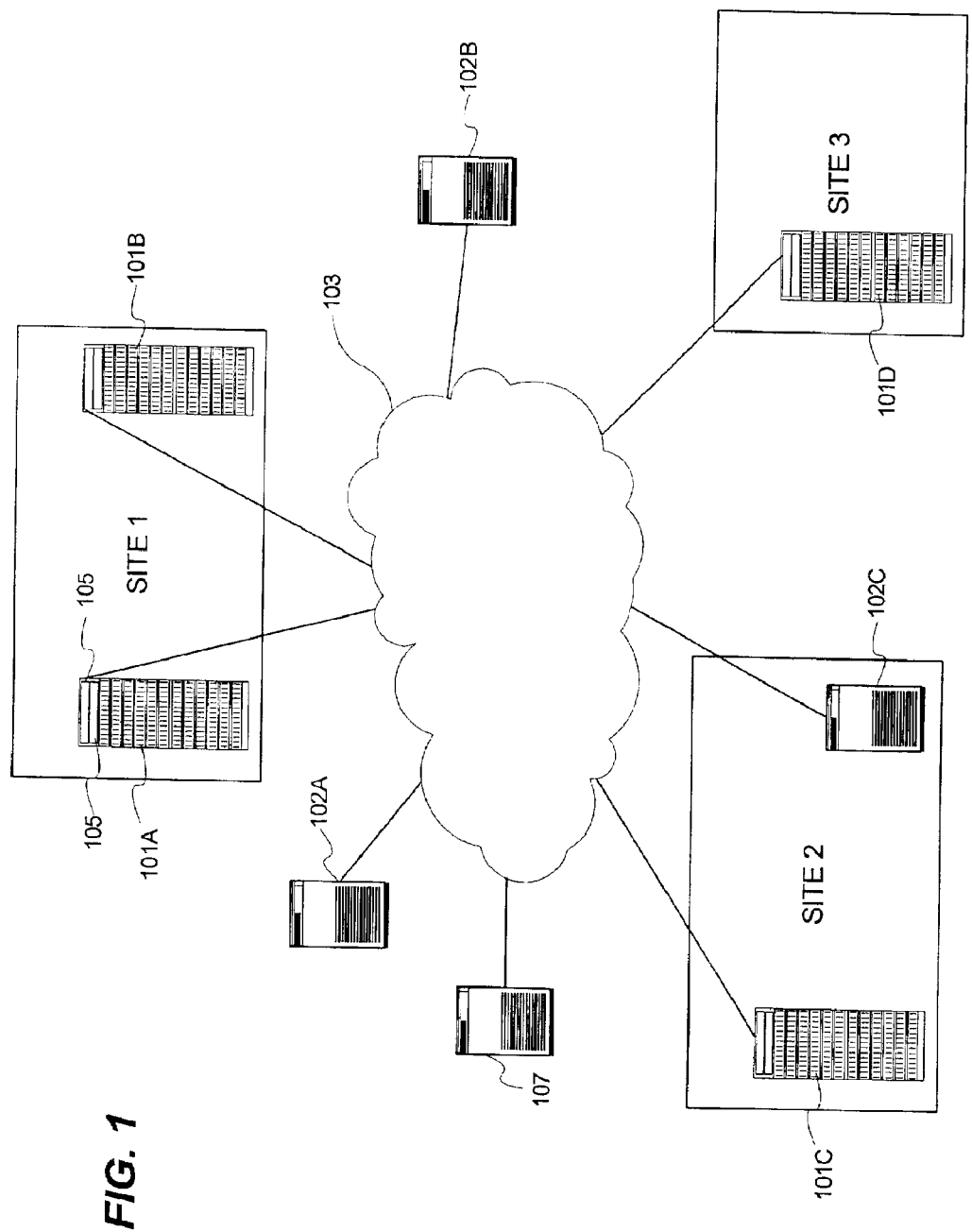
FIG. 1 shows a networked computer environment in which the present invention is implemented.

FIG. 1 illustrates a multi-site storage area network (SAN) implementing features in accordance with present invention. The example shown in FIG. 1 includes only three sites (Site 1, Site 2 and Site 3) to ease illustration and understanding. However, it should be understood that any number of sites might be provided to meet the needs of a particular application. The various sites may be physically proximate, or separated by an arbitrary distance. A particular implementation may well limit the number of possible sites, and may well limit the maximum or minimum physical separation of sites. Each site includes one or more storage cells 101, such as cells 101A, 101B, 101C and 101D. Any number of storage cells 101 maybe included in any site, although the number implemented in any particular application may be constrained to meet the needs of that application.

The storage implemented at various sites is accessed by host computers 102, such as host computers 102A, 102B and 102C. Host computers are generally machines that consume or require data storage. Typical host computers 102 demand large quantities of storage such as mainframes, web servers, transaction processors, and the like. However, a host computer 102 may comprise a computer of any processing capacity that requires or benefits from network storage either to reduce cost of the host 102, implement more storage capacity than practical in a host 102, share data amongst multiple hosts 102, or the like. A host computer 102 may couple to the storage cells 101 via a connection to network 103 such as illustrated by host computers 102A and 102B. In many cases, a host computer 102 will be located in a site such as host computer 102C located in site 2. The topological location of host computers 102 is a matter of design choice selected to meet the needs of the particular application. In many cases, one or more host computers 102 will be located at a site. It should be appreciated, however, that host computers 102 have little to do with the management and configuration of the DRM system of the present invention, other than that the DRM system is preferably able to satisfy storage needs of host computers 102 as consumers of data at various physical and topological locations.

Storage cells 101 and hosts 102 couple to data communication network 103. Storage cells 101 implement a quantity of data storage capacity that is accessible through storage controllers 105 that implement one or more connections to network 103. Storage cells 101 typically implement hundreds of gigabytes to terabytes of physical storage capacity. Controllers 105 virtualize the physical storage capacity such that it is configurable into logical units (LUNs) of storage capacity. The LUNs implement an arbitrary quantity of logical address block storage, where each LUN has a specified level of data protection such as redundant array of independent disks (RAID) 0–5 data protection. Hosts 102 access physical storage capacity by addressing read and write operations to specified LUNs, and can be otherwise unaware of the physical storage architecture or data protection strategy for a particular LUN that is being accessed. Storage controllers 105 manage the tasks of allocating physical storage capacity to specified LUNs, monitoring and maintaining integrity of the LUNs, moving data between physical storage devices, resizing LUNs, and other functions that maintain integrity and availability of the data stored therein.

Because storage is virtualized at each site, a LUN can be created, destroyed, resized, or otherwise reconfigured by specifying a number of attributes of the desired LUN without requiring the specification of the mechanics of the physical implementation. Attributes include, for example, the size of a LUN, data protection type, and whether the LUN will be replicated at more than one site. These attributes are used by controllers 105 to implement a LUN satisfying the specified attributes, or to modify an existing LUN to satisfy changes in attributes.

One important advantage of virtualized storage is that when a LUN is replicated across multiple sites, there are virtually no manual tasks involved in creating and/or modifying LUNs at any number of sites that satisfy the attributes necessary for DRM operation. When a LUN is replicated at multiple sites, a LUN is created at each site for implementing the replica. This set of LUNs is referred to as a "copy set" (e.g., copy set A and copy set B shown in FIG. 5), and the LUNs are referred to as members of the copy set. There are certain attributes, called dependent attributes that each member of a copy set must share, such as logical block capacity. There are other attributes, called independent attributes, that may vary among the members, such as RAID configuration. Virtualized storage allows the DRM system in accordance with the present invention to ensure that when changes are made to a dependent attribute of one member of a copy set, the change is made automatically to each other member of the copy set. At the same time, virtualized storage allows the DRM system in accordance with the present invention to implement changes to independent attributes at any time without affecting the other members of the copy set.

Figure 2:
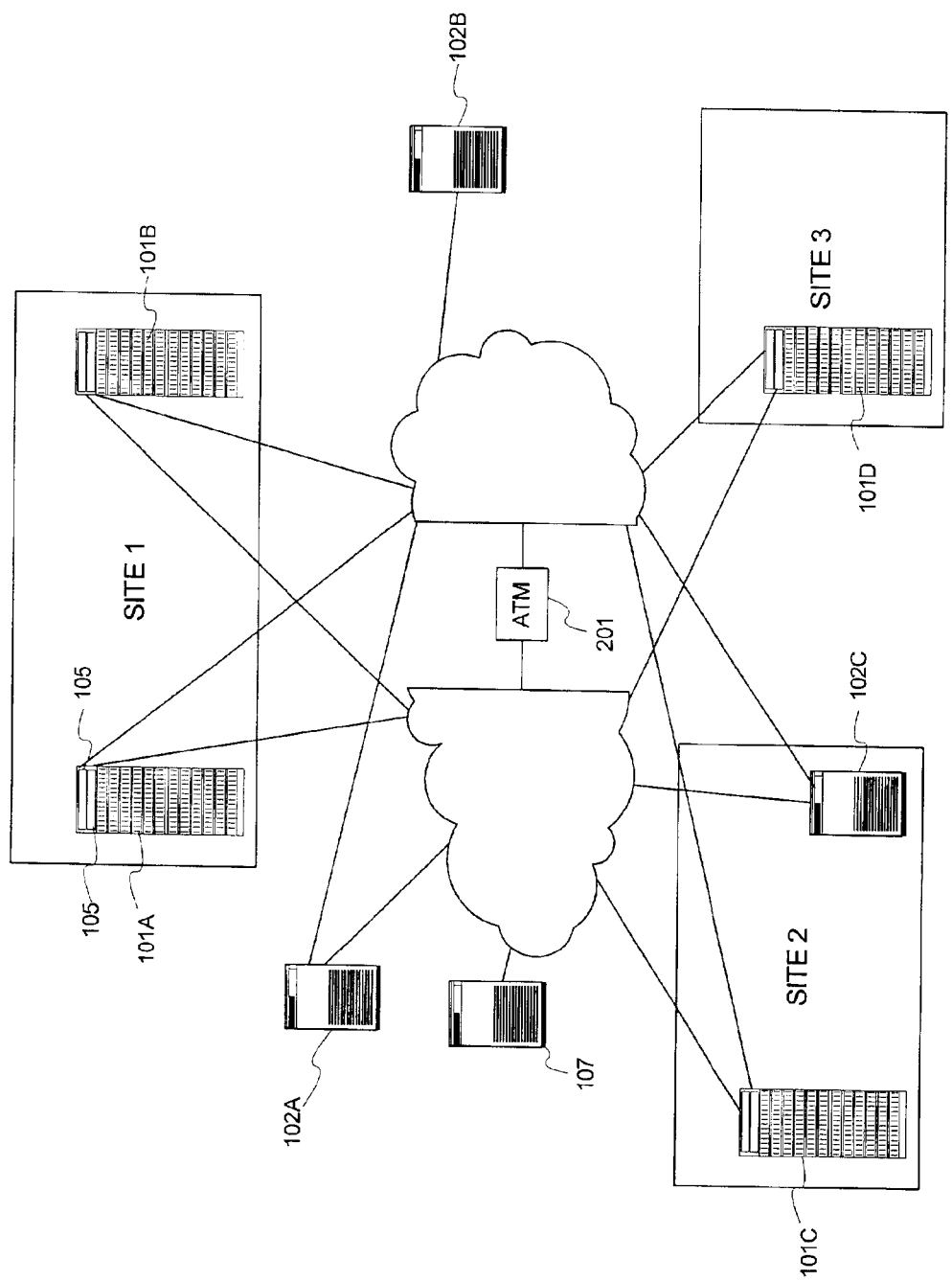
FIG. 2 illustrates an alternative networked computer environment embodying the present invention.

Network 103 comprises any of a variety of available networks, and may comprise a plurality of interconnected networks, as shown in FIG. 2. In particular examples, network 103 comprises at least two independent fibre channel fabrics to provide redundancy. These fibre channel fabrics may comprise long-distance connection mechanism 201 such as asynchronous transfer mode (ATM) and Internet protocol (IP) connections that enable sites to be separated by arbitrary distances.

At least one SAN management appliance (SMA) 107 is coupled to network 103 to enable connections to storage cells 101. In practice, a number of SMAs 107 are provided, and typically an SMA 107 is located at each site to provide management operation for the storage cells 101 at that site. However, because each SMA 107 communicates through network 103, the physical location of SMAs 107 is arbitrary. SMAs 107 are preferably implemented at topological locations that provide redundant connections to the storage cells 101.

Network 103 is accessible directly or indirectly to all components at Site 1, Site 2, and Site 3 including hosts 102 and controllers 105. In preferred implementations, each component has redundant links to network 103, and network 103 is preferably implemented as having redundant sub-networks as shown in FIG. 2. Redundancy provides connectivity in event of failure or degradation of some portions of network 103 (i.e., a link failure or connection failure). Redundancy also enables connectivity in the event of failure or degradation of controllers 105 and/or interface components of hosts 102.

In the systems of FIG. 1 and FIG. 2, it is important to realize that storage cell 101 is able to function as a primary storage location for any of hosts 102, and at the same time function as a secondary or alternative storage location for a replica of data from another storage cell 101. This feature is referred to as "bi-directionality". Unlike prior DRM systems where sites were rigidly configured as either primary or secondary sites, the present invention provides for flexible assignment at a much finer level of granularity, preferably such that individual virtual disks can be designated as either primary or alternate. One effect of such flexibility is that it becomes practical to implement enormous quantities of storage in each storage cell 101 as the capacity at each site can be readily applied to various applications with disparate storage needs.

FIG. 3 illustrates various features of the present invention embodied in a basic configuration. In the particular implementation, storage management appliances (SMAs) 107 include a bridge and a data replication management console (DRMC) which are cooperative software processes that each present a user interface for configuration and monitoring of DRM processes. The Bridge functions as an element manager for controllers 105, and handles basic functions of connecting to the communication network 103, issuing commands to controllers 105, and implementing security policies. All customer configuration and monitoring of DRM activities goes through the bridge. The DRMC provides increased functionality over the bridge interface, by managing solely DRM storage and providing assists, such as with site recovery.

Physical storage devices 302 are coupled to controllers 105 by a high-speed redundant connection such as fibre channel arbitrated loop (FCAL) connections. An FCAL connection allows each of tens or hundreds of individual hard disk drives to be accessed not only at high speed, but also by more than one controller 105 in a storage cell. Further, by providing redundant FCALs, one FCAL can fail while each storage device 302 remains accessible by either controller. The present invention is largely independent of the specific implementation of physical storage devices 302, and it is contemplated that other physical storage architectures will provide suitable equivalents for purposes of the present invention.

Hence, although FIG. 3 shows only a single controller 105, it is contemplated that each storage cell is preferably configured with more than one controller 105 in a redundant fashion. Further, by providing redundant FCALs, one FCAL can fail while each storage device 302 remains accessible by either controller 105. Because ports of controllers 105 are configured to handle both operational data transactions and DRM traffic, a single port connection between each controller 105 and a fabric or switch 301 is all that is necessary to implement data replication features of the present invention. However, the basic configuration shown in FIG. 3 sacrifices much redundancy, and would not be recommended for most applications, but is presented here to ease understanding of the present invention. It is important to understand that a great deal of flexibility exists in configuring the present invention for specific applications. Redundant connections and components can be added and removed flexibly to meet the needs of a particular application. Hence, various features of the configurations shown in FIG. 1 through FIG. 3 can be mixed and matched to configure a specific implementation.

FIG. 4 shows hierarchical relationships defined in accordance with the present invention to model data replication management. Prior to performing DRM operations, a storage cell 101 is implemented at each site, and a virtual disk 401 is allocated within a storage cell 101 that is handing operational data with one or more hosts 102. For any particular copy set, one virtual disk 401 is designated as a source, although it should be understood that a source virtual disk 401 might be allocated at any site implementing the DRM features of the present invention. Virtual disk 401 may comprise a plurality of physical storage resources that span multiple physical drives within the storage cell 101, and may implement any desired capacity and data protection type.

A destination virtual disk 402 is allocated within a storage cell 101 at a designated alternative or destination site. In normal operation, write operations are directed to source virtual disk 401, and copied in a background process to one or more destination virtual disks 402. Destination virtual disk 402 has the same logical storage capacity as the source virtual disk, but may provide a different data protection configuration. In other words, destination disk 402 shares all of the dependent attributes of source virtual disk 401, but is not required to share any of the independent attributes of virtual disk 401. Controllers 105 of the destination storage cell handle the allocation of destination virtual disk 402 autonomously. This allocation involves creating data structures that map logical addresses to physical storage capacity, and in a particular implementation involves processes described in greater detail in U.S. published patent application No. 2003-0084241 entitled "SYSTEM AND METHOD FOR ATOMIZING STORAGE" which is assigned to the assignee of the present invention and incorporated herein by reference.

The actual allocation and copying of data may take several minutes to several hours in the case of storage of many gigabytes or terabytes. These processes can be streamlined by allocating and copying only logical storage blocks that are used in source virtual disk 401. For example, a virtual disk 401 may implement 1 terabyte of storage, but a sparsely populated example may use only a few gigabytes of capacity to store actual data. In accordance with the present invention, destination virtual disk 402 will reserve resources needed to implement the entire 1 terabyte, but will only allocate and copy the locations that are actually used to store data and may only allocate the other locations. This greatly reduces the resources required to implement and maintain a replicate at the destination, and reduces the time required to create replicates.

In a preferred implementation, each controller 105 maintains metadata tracking which portions of a LUN have been written. By way of example, this metadata is tracked with a 1 MB resolution, however, other resolutions may be selected to meet the needs of particular applications. When a 1 MB range has not been written, then it is not copied during replication operations. Data is pre-zeroed on a virgin LUN so that any read directed to an unwritten address range will return all zeros. In a replication operation, only the written ranges need to be copied, after which both the source and destination LUNs will be identical as the unwritten ranges are zeroed in all LUNs.

A "copy set" is a set of member virtual disks where each member virtual disk is a replica of the others, and may comprise any number of replica virtual disks. While it may be easier to describe and understand the present invention by designating one virtual disk as a source or original virtual disk and the others as destinations or replicas, it is important to understand that once the copy set is created each member virtual disk is essentially a peer of all others. To create a copy set, the user designates a virtual disk as the source, and an alternate site storage cell (not a virtual disk) for the destination. The destination virtual disk does not exist prior to the copy set creation operation. Instead, it is created specifically to be a member of the copy set. Because each destination or alternative virtual disk is created on demand, it is created specifically and automatically to be compatible with the copy set. Hence, there is little or no manual procedure that must be performed to create new members for a copy set. This allows the copy set to increase (or decrease) its membership readily.

In the preferred implementation, objects do not span sites or storage controllers. Instead, objects exist at each site and are associated with each other as suggested in FIG. 5. For instance, the controller 105 views a "DRM Group" 505 as a source group associated with a destination group (represented by a dashed-line oval in FIG. 5). The controller does not have a copy set object per se, rather group members (virtual disks) that are associated with remote members (virtual disks). The copy set is represented by this association. In FIG. 5, virtual disks 501 are associated with virtual disks 502 to form a copy set and virtual disks 511 are associated with virtual disks 512 to form another copy set.

A DRM group 505 comprises a set of related virtual disks or LUNs that belong to copy sets that all have the same source and destination. Multiple groups 505 can exist for a given source and destination combination. While in one sense a group 505 spans sites, in practice a separate logical object that represents a group is implemented in each site (i.e., each controller 105 managing a group). Hence, in another sense each group 505 comprises a set of source halves of copy sets (i.e., the source virtual disks 501 and 511), or destination halves of copy sets (i.e., destination virtual disks 502 and 512). A group 505 is considered a "local group" by the controller 105 that implements the group logical object, and is considered a "remote group" when implemented by another controller 105. In other words, whether a group 505 is local or remote is determined from the perspective of a particular controller 105. A local group 505 is associated with a remote group 505 when the LUNs contained in each group are in the same copy set. In a multidirectional implementation, each local group 505 will be associated with a plurality of remote groups 505.

In essence, a group contains a collection of LUNs for which a combined I/O stream must be replicated in the LUNs of each remote group to provide certain properties with regard to its interruption (e.g. a copy set holding a database and a copy set holding a journal related to the database). DRM groups 505 are used for maintaining crash consistency and preserving WRITE ordering. "Crash consistency" refers to operation in the event that a host 102 or link to a host 102 crashes during a data transaction. In such event, it is important that the data transaction be committed to all members of the group or fail in all members of the group. In a database/journal implementation, for example, it is important to prevent a situation in which the database is modified, but the journal does not reflect the modification, or vice versa. The consistency property applies when the group has more than one member. In general, more than one virtual disk should be added to a group only if the application requires it. In most cases, a group should comprise only one member for optimal performance, in which cases the crash consistency behaviors are less important.

A group maintains write ordering among the members for asynchronous operation and logging/merging. Asynchronous operation refers to an operation mode in which a modification to one member of a copy set can be propagated to other members of the copy set after a time delay. During this time delay, the various replicas are inexact. When asynchronous operation is allowed, it is important that all replicas eventually implement the modification. Since multiple modification operations may be pending but uncommitted against a particular replica, it is necessary that the original order in which the modifications were presented be preserved when the pending modifications are applied to each replica. Even where asynchronous operation is not explicitly allowed, a destination LUN may become unavailable for a variety of reasons, in which case a copy set is implicitly operating in an asynchronous mode.

To ensure write order preservation, a record is maintained in a non-volatile storage device such as a cache for each group 505 that records the history of write commands and data from a host. The record is sized to store all write transactions until the transaction is committed to each member of a copy set. When required, the record can be written to a log on media-based storage and then later be replayed to merge the pending writes, in order, to each remote group 505. The ordering algorithm uses a "group sequence number" and the remote groups 505 ensure that the data is written in order sequence. Group members enter and exit logging at the same time, to assure order across the volumes.

Virtual disks in a group should have the same alternate site. A group is limited to 32 virtual disks in a particular implementation. A virtual disk can belong to at most one group. Virtual disks in the same DRM group 505 may belong to different disk groups. When a group object is created on the primary site controller, the controller automatically creates a symmetric group object on the alternate site controller. A group is created during copy set creation, if the user chooses not to use an existing group.

At a site, all members of a group are accessed on the same controller in a dual pair to enforce cache coherency (i.e., not split between dual controllers). The preferred storage cell should be the same on all members. When members are added to a group, they are automatically moved to reside on the same controller, and thereafter will failover together. If the preferred storage cell is changed on one member, it will change the setting for all members. These constraints create a configuration in which all members in a group share the same connection/path between source and destination sites. Different groups may share the same connection/path to the same alternate site or a different one. If more than one member in a group needs to copy, then they are copied one at a time with a queue depth selected to keep the pipe full for optimal performance.

Figure 6:
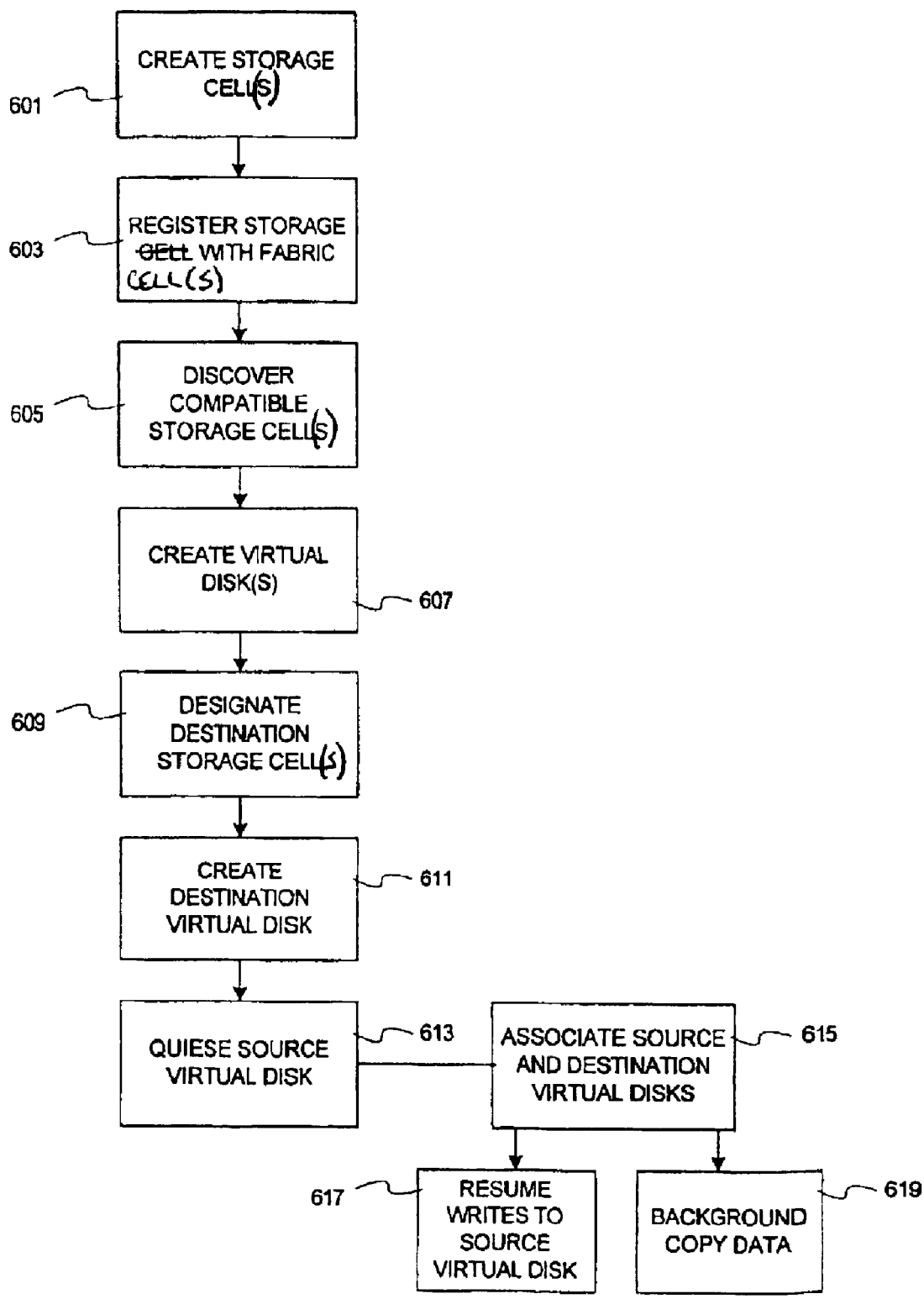
FIG. 6 conveys in flow-diagram form of operation of a data replication and storage management system according to an embodiment of the present invention.

FIG. 6 illustrates in flow-diagram form actions involved in operating the data replication management system in accordance with the present invention. At 601, a storage cell is created at each site to be used for storage and/or participation in the DRM system in accordance with the present invention. The storage cell creation involves the creation of logical records by controllers 105 that enable the manipulation and presentation of logical units using the physical storage capacity provided in a particular storage cell. Creation also includes actions for logging into a fabric using, for example, conventional fibre channel protocols. For purposes of simplification, the act of creation also involves allocating one or more virtual disks in the storage cells that function as primary virtual disks handling operational data transactions with various hosts.

Creation may also include registration step 603 in which the storage cells provides certain information to a fabric name server such as a universally unique identification (UUID) value. The logical construction or context of a storage cell 101 comprises the logical and data structures that are used to represent, manage and configure the raw physical storage capacity into devices that can be accessed by hosts 102 in a desired manner. To do this, controllers 105 implement and manage various logical objects that implement data structures and behavior to represent various components of each storage cell 101, preferably without involvement of hosts 102. All objects in the system are identified with a UUID. The UUIDs are stored persistently in metadata structures within the physical storage which enables all or part of a storage cell, and all the LUNs implemented therein, to be mapped and presented by any storage controller 105. In a data replication application, this benefit of virtualized storage architecture provides the ability to present the LUNs and the context in which they exist in event of a controller failure at one of the replica sites.

Information about each registered storage cell 101 in a SAN is accessed using conventional FC protocols to provide various information about the storage cells 101 to other fabric-connected devices. Each controller is identified by a unique identification number such as a 64-bit worldwide name, which is registered with the name server of the fabric 301. A storage cell unique identification is provided as a 128-bit UUID in which the first 64 bits are taken from the controller worldwide name. The storage cell UUID can be used to distinguish the storage cell from other types of devices (e.g., hosts), and to indicate manufacturer, product type, version numbers, and the like that enable other devices to communicate with each other efficiently.

The registration operation 603 does not, however, convey any implementation specific information in the fabric such as capacity of a storage cell, operating state, or the like. This information can be obtained by link services running between controllers 105, if desired. Preferably a link service is defined for exchanging cell implementation-specific information in operation 605 (described below) such as firmware versions, operating state, DRM groups, and other DRM related data that enables distributed management of DRM events and actions.

Operation 607 includes creation of one or more virtual disks used to store operational data from one or more hosts. These virtual disks will become source virtual disks when included in a copy set, but the designation as a source has little meaning at that time. Virtual disks may be created at substantially the same time as a copy set is defined and so will be virgin or blank. In the case of a virgin source disk, the replica will be complete upon creation of a destination disk as both the source and destination disk are pre-zeroed for unused blocks. Alternatively, operation 607 may be performed any time before a copy set is defined. When virtual disks are written to before the copy set is defined, the written blocks must be coped from the source to destination before the copy set is complete.

A data replication process is initiated when a source virtual disk created in operation 607 is selected and the user indicates (e.g., via the Bridge interface shown in FIG. 3) a desire to create a data replica at one or more selected other storage cells 101. It is contemplated that the system could automatically select a storage cell to host the replica rather than enabling user selection. In operation 605, a source controller will query fabric 301 to discover compatible storage cells (i.e., storage cells that implement DRM services compatible with the present invention). The identity of storage cells that can support DRM operations in accordance with the present invention is then presented to the user to enable identification and selection of storage cells 101 that are available to serve as destinations in any particular instance.

Once input is obtained through the Bridge to designate one or more virtual disks in a storage cell as source virtual disks, and to designate one or more storage cells 101 as destinations in step 609, the link service conveys a message from the controller 105 in the source storage cell to the controller 105 in the destination storage cell indicating any dependent and independent attributes necessary to create the destination LUN. For example, the size of the source virtual disk must be provided, and independent attributes such as the protection type desired (e.g., none, mirrored, parity or the like) may be provided to the designated destination storage controller 105. The link service also communicates information such as the UUID of the source LUN and other parameters useful for conducting DRM transactions.

In operation 611, the controller 105 at the designated destination storage cell 101 creates a destination virtual disk by determining if sufficient resources exist in the storage 302 (FIG. 3) to implement the desired virtual disk in both quantity and data protection type. In the event insufficient resources exist, a failure message is returned to the controller at the source site, and communicated in an appropriate manner to the user so that alternative action can be considered. When sufficient resources are available, those resources are reserved or committed by the destination controller 105 to ensure that the resources can be eventually used to implement the destination virtual disk, and various logical objects used to represent the destination virtual disk are instantiated. An acknowledge message is returned to the requesting controller 105 including information such as a UUID of the destination virtual disk that will enable subsequent communication.

By way of comparison to prior systems, creation of a destination virtual disk typically required significant manual procedures at both controllers 105 at the source and destination sites. Prior systems often required knowledge of the physical storage implementation down to the spindle level to set up the destination storage. By using virtualized storage at the source, and particularly at the destination site, the tasks performed in operation 611 can be readily automated.

Although the destination virtual disk has been created in operation 611, it does not yet have a complete logical structure, nor does it contain data, if any, from the source virtual disk. To establish a connection with the newly created destination virtual disk, the source disk is briefly quiesced in operation 613, during which time operational data traffic with hosts 102 may be cached. Once the connection is established and source and destination virtual disks are associated in operation 615, which might take only a matter of milliseconds, operational write transactions with the source LUN can be resumed in operation 617. Background copying of data proceeds in parallel in operation 619, including copying any preexisting written blocks in the source virtual disk as well as copying newly written data.

As noted before, the copy operation 619 is aided by tracking which logical blocks in a source virtual disk have been written to. In prior systems, this time where the source disk was halted could be significant, especially for existing disks. The data would not be replicated until completion of a block-by-block copy. In accordance with the present invention, however, only blocks that have been written are copied. Data copy operations continue so long as a source virtual disk is a member of a copy set. Each time data is written or modified in the source virtual disk, a remote copy operation is scheduled to the destination virtual disk. The time lag between a modification of the source virtual disk and the destination virtual disk can be altered to meet the needs of a particular application. Data replication operations required to copy the data from source to destination can be spread over time, and spread over physical resources (e.g., controllers, ports, channels, and the like) as needed to meet the needs of a particular application.

It is apparent that the system of the present invention provides efficiency in that normal operational data transactions can be resumed almost instantaneously after creation of a replica destination. Moreover, further data replication management actions can continue while other data replication management operations continue in the background. Additional copy sets can be defined, and copy processes initiated while the earlier defined DRM actions continue in the background. These additional copy sets may involve the same or different sets of storage cells 101. In a system where all copy sets are defined, the ongoing operations of copying data from a source to one or more destinations can be performed simultaneously between multiple copy sets.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for replicating data in a storage area network comprising a plurality of storage cells and a communication network coupled to the storage cells, the method comprising:
    implementing a virtualized logical unit (LUN) of storage in a first storage cell;
    designating the LUN in the first storage cell as a source LUN;
    designating at least one other storage cell as a destination storage cell;
    creating a destination LUN in the at least one other storage cell such that the destination LUN is suitable to replicate the source LUN;
    quiescing operational data transactions with the source LUN; and
    creating an association between the source LUN and the destination LUN to form a copy set; and
    resuming operational data transactions with the source LUN upon creation of the association.

2. The method of claim 1 further comprising communicating from the first storage cell to the at least one other storage cell attributes that will make the destination LUN suitable to replicate the source LUN.

3. The method of claim 1 further comprising communicating from the at least one destination storage cell to the first storage cell identification information allowing the first storage cell to identify logical structures of the destination LUN.

4. The method of claim 1 further comprising registering each storage cell with a name service in the communication network.

5. The method of claim 4 further comprising causing the first storage cell to use the name service to identify at least one other storage cell that is compatible with the replication management processes of the first storage cell.

6. The method of claim 1 wherein the act of resuming operational data transactions occurs before all data has been copied from the source LUN to the destination LUN.

7. The method of claim 1 wherein the act of resuming operational data transactions occurs before the destination LUN has been completely allocated in the destination storage cell.

8. The method of claim 1 further comprising copying data from the source LUN to the destination LUN in a background process while operational data transactions continue to the source LUN.

9. A data replication controller for managing replication of data in a storage area network, the data replication controller comprising:
    processor configured to implement software processes;
    a pool of virtualized storage accessible through the data processor system;
    wherein the processor executes processes to enable the data replication controller to couple to an external communication network;
    wherein the processor executes processes for designating a virtual disk as a source virtual disk; and
    wherein the processor executes processes to enable the data replication controller to cause a second data replication controller to create a destination virtual disk.

10. The data replication controller of claim 9 wherein the destination virtual disk has the same capacity as the source virtual disk.

11. The data replication controller of claim 9 wherein the destination virtual disk is created without user intervention.

12. The data replication controller of claim 9 wherein normal data transactions to the source virtual disk are resumed before physical storage capacity is fully allocated to the destination virtual disk.

13. The data replication controller of claim 9 wherein normal data transactions to the source virtual disk am resumed before data is copied from the source virtual disk to the destination virtual disk.

14. The data replication controller of claim 9 which causes the second data replication controller to implement a background copy operation to copy data from the source virtual disk to the destination virtual disk.

15. The data replication controller of claim 9 which executes processes within the data replication controller for discovering external storage controllers coupled to the external communication network using universal unique identification (UUID) registration information in a name server.

16. A storage area network (SAN) comprising:
    a source disk at a first site;
    a virtualized storage pool at a second site; and
    a controller at the second site executing processes that implement a virtualized destination disk from the virtualized storage pool at the second site.

17. The SAN of claim 16 wherein the virtualized destination disk comprises a capacity of logical block storage that is identical to a capacity of logical block storage of the source disk.

18. The SAN of claim 16 wherein the virtualized destination disk comprises a data protection attribute that is different from a data protection attribute of the source disk.

19. The SAN of claim 16 wherein the source disk comprises a virtualized disk implemented from a storage pool at the first site.

20. The SAN of claim 16 wherein the controller further executes a process that responds to changes in a source disk attribute to automatically implement a corresponding virtualized change in a corresponding destination disk attribute.

* * * * *

UNITED STATES PATENT AND TRADEMARK OFFICE
CERTIFICATE OF CORRECTION

PATENT NO. : 6,880,052 B2
APPLICATION NO. : 10/106906
DATED : April 12, 2005
INVENTOR(S) : Clark Lubbers et al.

It is certified that error appears in the above-identified patent and that said Letters Patent is hereby corrected as shown below:

Claim 5, Column 13, line 57, before "replication" delete "the" and insert therefor --data--

Signed and Sealed this

Twenty-eighth Day of July, 2009

JOHN DOLL
*Acting Director of the United States Patent and Trademark Office*